(12) United States Patent
Sawamoto et al.

(10) Patent No.: US 6,311,119 B2
(45) Date of Patent: *Oct. 30, 2001

(54) VEHICLE CONTROL SYSTEM

(75) Inventors: Kiichirou Sawamoto; Akira Iihoshi, both of Wako (JP)

(73) Assignee: Honda Giken Kojyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,672

(22) Filed: Jul. 2, 1998

(30) Foreign Application Priority Data

Jul. 7, 1997 (JP) .................................................. 9-181498

(51) Int. Cl.⁷ .............................. G08G 1/16; G01S 13/93; B60T 7/12
(52) U.S. Cl. .............................. 701/96; 701/300; 340/435
(58) Field of Search .......................... 701/96, 300, 301; 340/435, 436, 903; 342/70, 455; 348/118

(56) References Cited

U.S. PATENT DOCUMENTS

| | | |
|---|---|---|
| 5,197,562 | 3/1993 | Kakinami et al. . |
| 5,309,137 * | 5/1994 | Kajiwara ................. 340/436 |
| 5,369,590 * | 11/1994 | Karasudani ............... 364/460 |
| 5,400,864 | 3/1995 | Winner et al. . |
| 5,521,579 * | 5/1996 | Bernhard ................. 340/438 |
| 5,529,139 | 6/1996 | Kurahashi et al. . |
| 5,572,428 | 11/1996 | Ishida et al. . |
| 5,612,699 * | 3/1997 | Yamada .................. 342/70 |
| 5,648,905 * | 7/1997 | Izumi et al. .............. 364/461 |
| 5,710,565 * | 1/1998 | Shirai et al. .............. 342/70 |
| 5,871,062 * | 2/1999 | Desens et al. ............. 180/169 |
| 5,955,967 * | 9/1999 | Yamada .................. 340/904 |

FOREIGN PATENT DOCUMENTS

| | | |
|---|---|---|
| 0 657 857 A1 | 12/1994 | (EP) . |
| 2 229 874 A | 10/1999 | (GB) . |
| 6-144076 | 5/1994 | (JP) . |

OTHER PUBLICATIONS

Entwicklungsschritte zur Erhohung von Sicherheit und Komfort durch sehende Autos by E. D. Dickmanns; May 1996; pp. 243–251, Not translated.

\* cited by examiner

Primary Examiner—Tan Nguyen
Assistant Examiner—Dalena Tran
(74) Attorney, Agent, or Firm—Lyon & Lyon LLP (57) ABSTRACT

A vehicle control system for controlling its own vehicle to follow another vehicle in pursuit has a radar unit. The radar unit has function for detecting a relative distance from its own vehicle to a front vehicle in front of its own vehicle and a relative speed of the front vehicle with respect to its own vehicle, and outputting information representing the relative distance and the relative speed. A lane change detector detects a lane change which is made by its own vehicle and outputs a lane change signal indicative of the lane change. A processor estimates a future lane or path for its own vehicle from the lane change signal from the lane change detector, unlocks a preceding vehicle which its own vehicle has followed, and determines a new preceding vehicle which its own vehicle is to lock on based on the estimated future lane or path and the information outputted by the radar unit.

8 Claims, 7 Drawing Sheets

FIG. 7

VEHICLE CONTROL SYSTEM

BACKGROUND OF THE INVENTION

1. Field of the Invention

The present invention relates to a vehicle control system for controlling a vehicle of its own to follow a preceding vehicle while running in pursuit.

2. Description of the Prior Art

One known vehicle control system is disclosed in Japanese laid-open patent publication No. 6-144076. The disclosed vehicle control system controls a vehicle of its own based on the distance between the vehicle of its own and a preceding vehicle so as to follow the preceding vehicle.

The vehicle control system has a vehicle-to-vehicle distance detector for detecting the distance from its own vehicle which incorporates the vehicle control system to a preceding vehicle, a steering angle detector for detecting a steering angle of its own vehicle, a vehicle speed detector for detecting a vehicle speed of its own vehicle, a turn radius calculator for calculating the radius of a turn which its own vehicle is making based on the detected steering angle and the detected vehicle speed, an evaluator for evaluating the probability that the preceding vehicle is running in the lane of its own vehicle based on the calculated turn radius and the detected vehicle-to-vehicle distance, and a controller for controlling the throttle valve or brake of its own vehicle based on the evaluated probability.

In operation, the vehicle control system calculates the radius of a turn which its own vehicle is making based on the detected steering angle and the detected vehicle speed, and decides whether the preceding vehicle is present in the lane of its own vehicle based on the calculated turn radius and the detected vehicle-to-vehicle distance.

The vehicle control system quantitatively evaluates the possibility of an erroneous detection of a preceding vehicle based on the fact that such an erroneous detection depends on the turn radius and the vehicle-to-vehicle distance, and adjusts a control gain for the throttle valve or brake control process depending on the possibility of the erroneous detection, i.e., the probability that the detected preceding vehicle is positioned in the lane of its own vehicle, for thereby varying the characteristics of its own vehicle with which to follow the preceding vehicle.

Since the control gain is lowered with respect to a preceding vehicle whose possibility of being erroneously detected is high, the vehicle control system will not be adversely effected by a preceding vehicle running in an adjacent lane.

The disclosure of Japanese laid-open patent publication No. 6-144076 is silent about how the vehicle control system operates when its own vehicle changes lanes.

When the driver of its own vehicle turns the steering wheel clockwise to move its own vehicle from the present lane to a right lane, the conventional vehicle control system determines a front vehicle running on the right side as a new preceding vehicle to follow. At this time, when the driver returns the steering wheel counterclockwise to orient its own vehicle along the right lane, the conventional vehicle control system tends to determine a vehicle running in the original lane, from which its own vehicle has moved to the right lane, as a new preceding vehicle to follow.

Conversely, when the driver of the vehicle turns the steering wheel counterclockwise to move its own vehicle from the present lane to a left lane, the conventional vehicle control system determines a front vehicle on the left side as a new preceding vehicle to follow. At this time, when the driver returns the steering wheel clockwise to orient its own vehicle along the left lane, the conventional vehicle control system tends to determine a vehicle running in the original lane, from which the vehicle has moved to the left lane, as a new preceding vehicle to follow.

Specifically, such a problem will be described below with reference to FIGS. 1A–1C and 2 of the accompanying drawings.

Figure 1A:
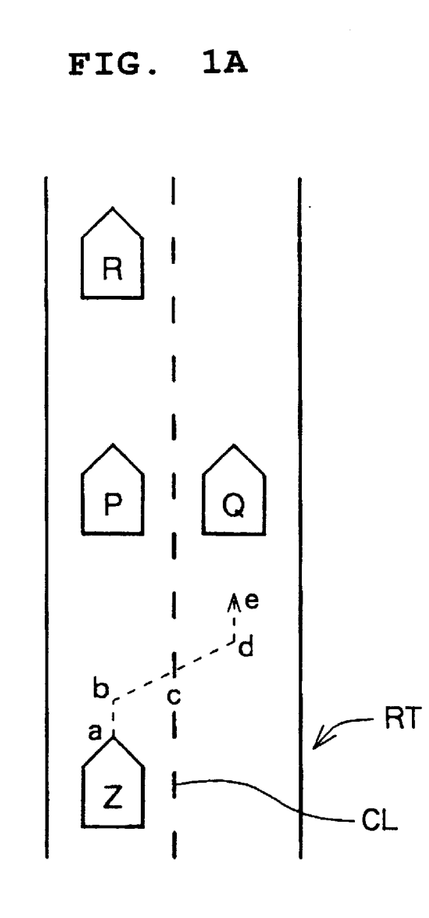
FIGS. 1A, 1B, and 1C are schematic plan views showing the positional relationship between vehicles when one of the vehicles makes a lane change.
Figure 1B:
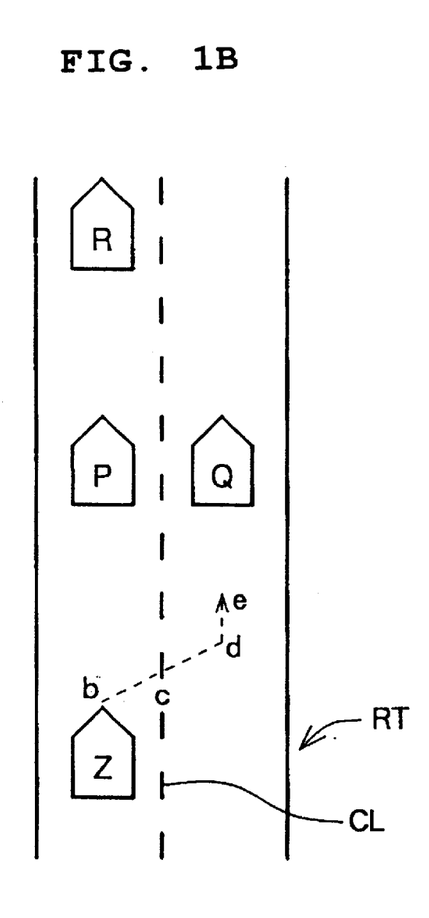
Figure 1C:
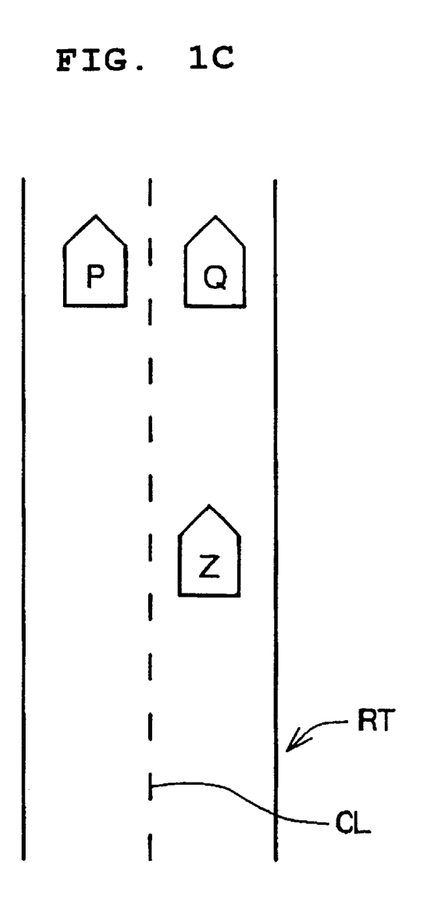

It is assumed that a vehicle Z of its own, i.e., a vehicle which incorporates the vehicle control system, follows a preceding vehicle P while running along a lane in a road RT, as shown in FIG. 1A, and then changes from the lane to an adjacent lane across a lane line CL, as shown in FIG. 1B, and after changing to the adjacent lane, its own vehicle Z follows a preceding vehicle Q in the adjacent lane, as shown in FIG. 1C.

Figure 2:
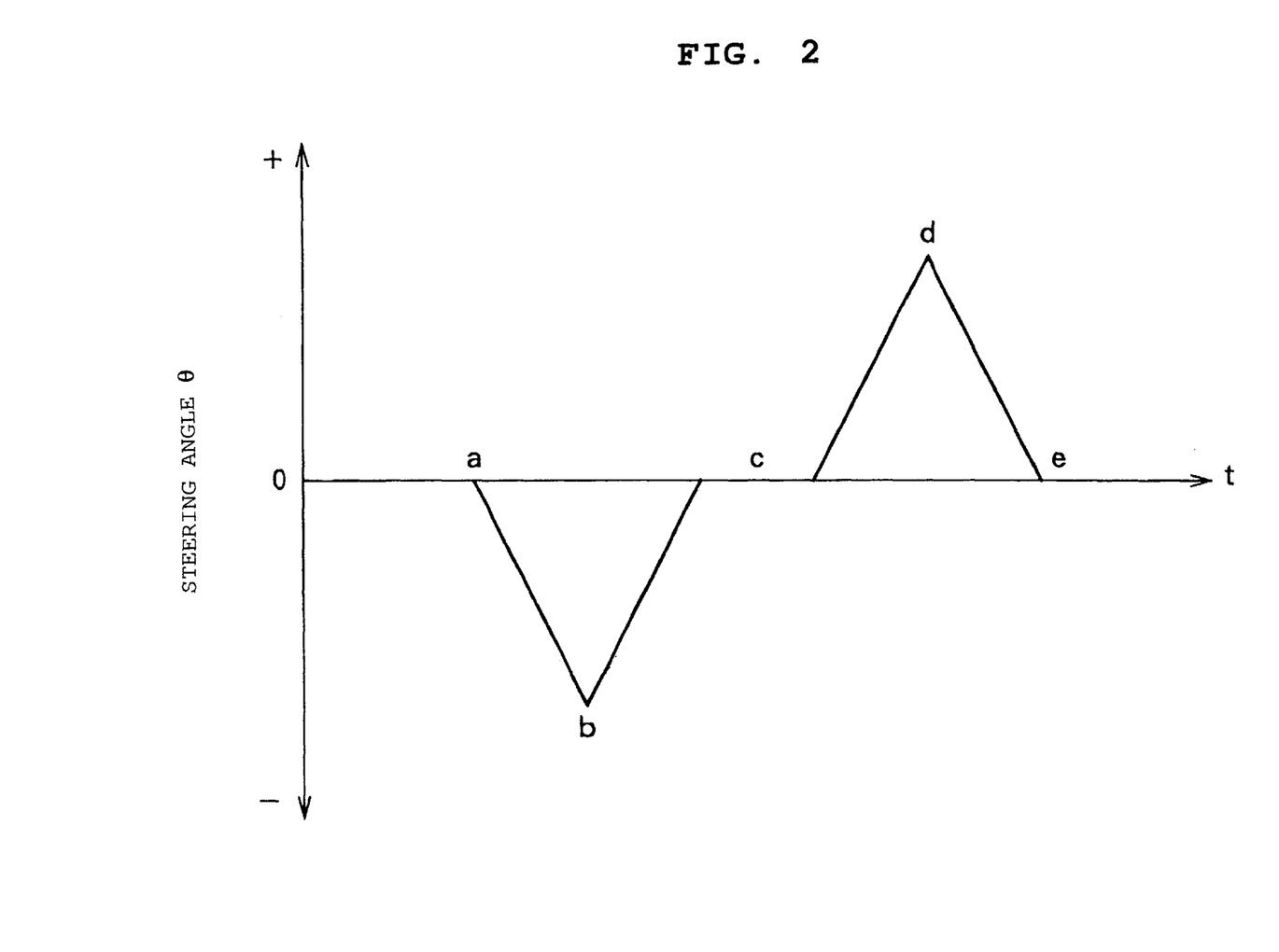
FIG. 2 is a diagram showing the manner in which the steering angle of a vehicle which makes a lane change varies with time.

FIG. 2 of the accompanying drawings shows the manner in which the steering angle θ of the vehicle Z varies when the vehicle Z changes the lanes. In FIG. 2, the steering angle θ is positive when the steering wheel of the vehicle Z is turned counterclockwise, and negative when the steering wheel of the vehicle Z is turned clockwise. The yaw rate of the vehicle Z is plotted in the same pattern as shown in FIG. 2 when the vehicle Z changes the lanes.

The steering angle θ goes through different values a–e shown in FIG. 2 as the vehicle Z moves through successive corresponding points a–e shown in FIG. 1B while changing the lanes.

If a preceding vehicle is determined based on the yaw rate or the steering angle of the vehicle Z without detecting the lane change, then the preceding vehicle may erroneously be determined when the steering wheel is returned in the vicinity of the point d.

Specifically, while the vehicle Z is running along the original lane, it locks on and follows the preceding vehicle P which is also running in the same lane. When the vehicle Z changes from the original lane to a right lane, it unlocks the preceding vehicle P, and moves into the right lane by turning the steering wheel clockwise. Immediately before the vehicle Z completes the lane change, the steering wheel of the vehicle Z is returned counterclockwise in the vicinity of the point p, and the vehicle Z tends to recognize the vehicle P as a preceding vehicle again.

Therefore, until the vehicle Z completes the lane change, the vehicle Z cannot determine the vehicle Q definitely as a preceding vehicle. As a result, a relatively long period of time is spent from the time when the vehicle Z unlocks the preceding vehicle P to the time when the vehicle Z finally locks on the preceding vehicle Q. For this reason, the driver of the vehicle Z is likely to feel that the vehicle Z is not making the lane change smoothly.

SUMMARY OF THE INVENTION

It is therefore an object of the present invention to provide a vehicle control system for accurately determining a preceding vehicle to follow when changing lanes.

Another object of the present invention is to provide a vehicle control system which prevents a vehicle running obliquely in front of its own vehicle in a lane adjacent to a lane which its own vehicle reaches after changing lanes, from being determined as a preceding vehicle to follow.

According to an aspect of the present invention, there is provided a vehicle control system for controlling its own vehicle to follow another vehicle in pursuit, comprising a radar unit for detecting a relative distance from its own vehicle to a front vehicle in front of its own vehicle and a relative speed of the front vehicle with respect to its own vehicle, and outputting information representing the relative distance and the relative speed, a lane change detector for detecting a lane change which is made by its own vehicle and outputting a lane change signal indicative of the lane change, and a processor for estimating a future lane or path for its own vehicle from present running states of its own vehicle and the lane change signal from the lane change detector, and determining a preceding vehicle which its own vehicle is to follow based on the estimated future lane or path and the information outputted by the radar unit.

If a preceding vehicle were determined on the basis of the yaw rate or steering angle of its own vehicle without the detection of a lane change, a wrong vehicle would tend to be determined as a preceding vehicle when the steering wheel of its own vehicle is returned upon the lane change.

With the vehicle control system according to the present invention, however, since the lane change detector outputs a lane change signal representing a lane change, and the processor estimates a future lane or path based on the lane change signal, any wrong vehicle is prevented from being determined as a preceding vehicle.

Furthermore, because the processor estimates a future lane or path based on the lane change signal, it can clearly distinguish a lane or path for its own vehicle before and after the lane change.

According to another aspect of the present invention, there is provided a vehicle control system for controlling its own vehicle to follow another vehicle in pursuit, comprising a radar unit for detecting a relative distance from its own vehicle to a front vehicle in front of its own vehicle and a relative speed of the front vehicle with respect to its own vehicle, and outputting information representing the relative distance and the relative speed, a lane change detector for detecting a lane change which is made by its own vehicle and outputting a lane change signal indicative of the lane change, and a processor for estimating a future lane or path for its own vehicle from present running states of its own vehicle, determining a preceding vehicle which its own vehicle is to follow based on the estimated future lane or path and the information outputted by the radar unit, and preventing its own vehicle from following the preceding vehicle in response to the lane change signal outputted by the lane change detector.

Inasmuch as its own vehicle is prevented from following the preceding vehicle upon the lane change, the vehicle control system is prevented from determining, as a preceding vehicle, a vehicle which is running obliquely in front of its own vehicle in a lane adjacent to the lane in which its own vehicle runs after the lane change.

The processor comprises means for determining a vehicle closest to its own vehicle in the estimated future lane or path therefor, as a preceding vehicle which its own vehicle is to follow based on the estimated future lane or path and the information outputted by the radar unit. After the lane change, the processor can continuously control its own vehicle to follow the preceding vehicle.

The lane change detector comprises a steering angle sensor for detecting a steering angle of its own vehicle and means for outputting the lane change signal when the detected steering angle is greater than a predetermined threshold. When the steering angle varies in excess of the predetermined threshold, the lane change detector can quickly detect a lane change. The lane change detector is also capable of detecting when its own vehicle is making a lane change and has completed a lane change.

The lane change detector comprises a yaw rate sensor for detecting a yaw rate of its own vehicle and means for outputting the lane change signal when the detected yaw rate is greater than a predetermined threshold. When the yaw rate varies in excess of the predetermined threshold, the lane change detector can quickly detect a lane change. The lane change detector is also capable of detecting when its own vehicle is making a lane change and has completed a lane change.

According to still another aspect of the present invention, there is provided a vehicle control system for controlling its own vehicle to follow another vehicle in pursuit, comprising a radar unit for detecting a relative distance from its own vehicle to a front vehicle in front of its own vehicle and a relative speed of the front vehicle with respect to its own vehicle, and outputting information representing the relative distance and the relative speed, a lane change detector for detecting a lane change which is made by its own vehicle and outputting a lane change signal indicative of the lane change, and a processor for estimating a future lane or path for its own vehicle from the lane change signal from the lane change detector, unlocking a preceding vehicle which its own vehicle has followed, and determining a new preceding vehicle which its own vehicle is to lock on based on the estimated future lane or path and the information outputted by the radar unit.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 3:
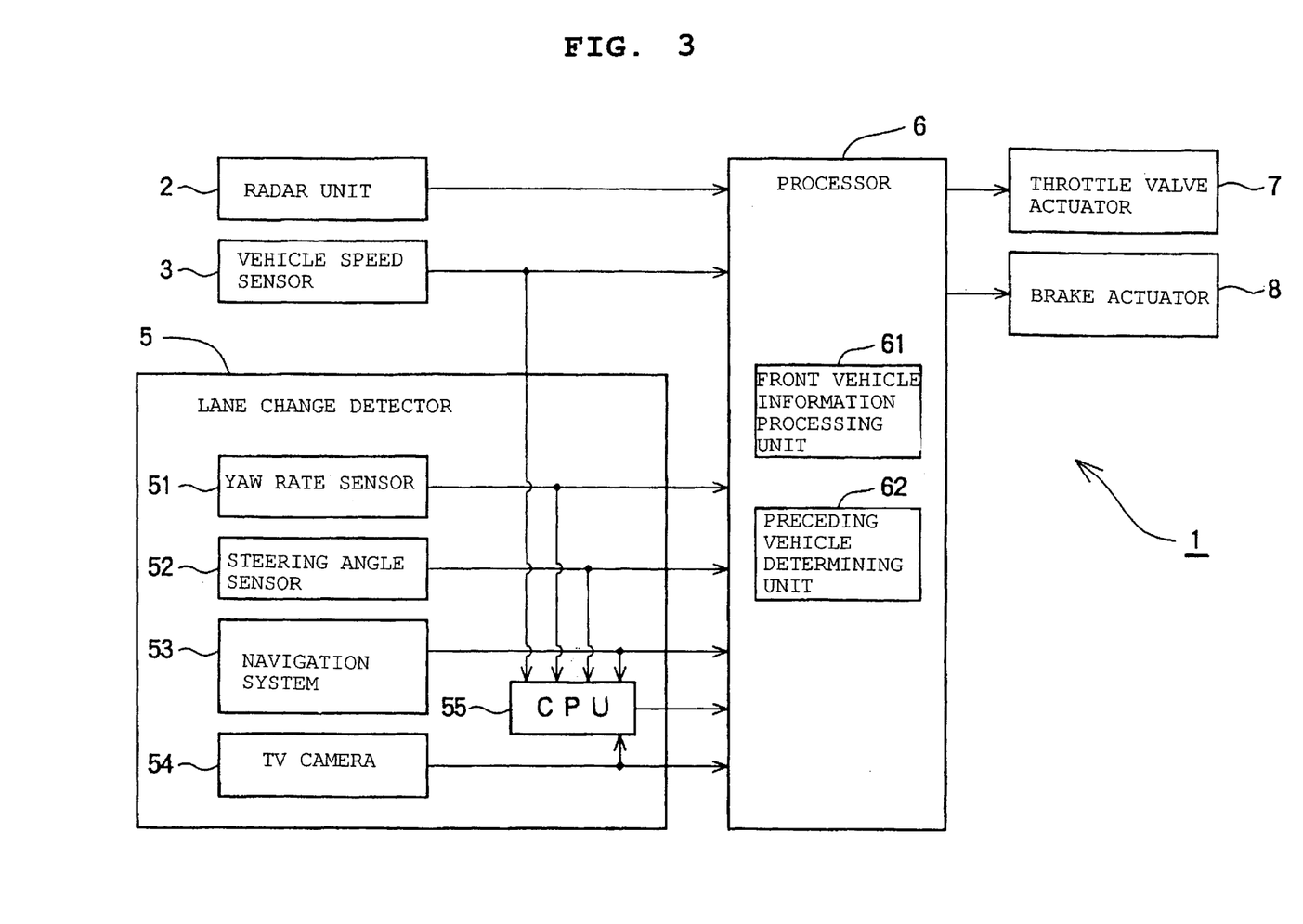
FIG. 3 is a block diagram of a vehicle control system according to the present invention.

As shown in FIG. 3, a vehicle control system 1 according to the present invention generally comprises a radar unit 2 for detecting the distance between a vehicle of its own which incorporates the vehicle control system 1 and another vehicle which runs in front of its own vehicle and the speed of the other vehicle with respect to its own vehicle, and outputting information representing the distance and the speed, and a processor 6 for estimating a future lane or path for its own vehicle and determining a preceding vehicle which its own vehicle is to follow, based on the estimated future lane or path and the information from the radar unit 2.

The vehicle control system 1 also has a throttle valve actuator 7 and a brake actuator 8. The throttle valve actuator 7 or the brake actuator 8 is controlled by the processor 6 to increase or reduce the vehicle speed of its own vehicle for allowing its own vehicle to automatically follow a preceding vehicle while maintaining a sufficient vehicle-to-vehicle distance between its own vehicle and the preceding vehicle.

The vehicle control system 1 further includes a lane change detector 5 for detecting a lane change made by its own vehicle and outputting a lane change signal, and a vehicle speed sensor 3 for detecting a vehicle speed of its own vehicle.

The processor 6 estimates the future lane or path for its own vehicle based on a lane change signal from the lane change detector 5. The processor 6 may comprise a microcomputer system, a DSP (digital signal processor), or an ECU (electronic control unit).

The radar unit 2 radiates an electromagnetic wave or a laser beam in front of its own vehicle, receives an echo wave or beam reflected from a vehicle in front of its own vehicle, and detects the distance between its own vehicle and another vehicle which runs in front of its own vehicle and the speed of the other vehicle with respect to its own vehicle.

The radar unit 2 may comprise an FM-CW radar unit or a pulse radar unit, and may be arranged to detect the relative distance and the relative speed from a beat signal which is generated by mixing the transmitted electromagnetic wave and the echo wave.

The transmitted electromagnetic wave may have a frequency ranging from 30 GHz to 150 GHz.

The lane change detector 5 comprises a yaw rate sensor 51 for detecting a yaw rate of its own vehicle, a steering angle sensor 52 for detecting a steering angle of its own vehicle, a high-precision navigation system 53, a TV camera 54 for imaging a scene in front of its own vehicle, and a CPU 55 for performing various calculations. The lane change detector 5 may additionally have a D(differential)-GPS (global positioning system).

A yaw rate signal detected from the yaw rate sensor 51, a steering angle signal detected from the steering angle sensor 52, a vehicle speed signal detected from the vehicle speed sensor 3, a signal from the navigation system 53, and a video signal from the TV camera 54 are supplied to the CPU 55 and the processor 6.

The CPU 55 has a certain threshold level for determining a lane change, which is established in advance with respect to a detected signal from the yaw rate sensor 51 or the steering angle sensor 52.

When the yaw rate sensor 51 or the steering angle sensor 52 generates a signal detected in excess of the threshold level, the CPU 55 determines that its own vehicle is making a lane change, and supplies a lane change signal to the processor 6.

The CPU 55 also calculates a history of movement of its own vehicle from the vehicle speed and steering angle (or yaw rate) of its own vehicle. If a lateral displacement corresponding to a lane change occurs in the calculated history of movement, then the CPU 55 determines that its own vehicle is making a lane change, and supplies a lane change signal to the processor 6.

The CPU 55 can also determine that its own vehicle is making a lane change from positional information of its own vehicle supplied from the navigation system 53.

The CPU 55 can also determine that its own vehicle is making a lane change based on the operation of a direction indicator of its own vehicle.

Furthermore, the CPU 55 identifies a road and a white marking line on the road based on a video signal from the TV camera 54. The CPU 55 determines that its own vehicle is making a lane change from the identified white marking line, the yaw rate or the steering wheel of its own vehicle.

Based on the information of a vehicle running in front of its own vehicle from the TV camera 54, the vehicle speed from the vehicle speed sensor 3, the video signal from the TV camera 4, the lane change signal from the lane change detector 5, the raw rate from the yaw rate sensor 51, and the steering angle from the steering angle sensor 52, the processor 6 controls the throttle valve actuator 7 or the brake actuator 8 to increase or reduce the vehicle speed of its own vehicle for allowing its own vehicle to automatically follow a preceding vehicle while maintaining a sufficient vehicle-to-vehicle distance between its own vehicle and the preceding vehicle.

The processor 6 also calculates a width W (see FIGS. 6A and 6B) of the lane in which its own vehicle is running, from the video signal from the TV camera 4.

The processor 6 has a front vehicle information processing unit 61 which plots in a common coordinate system the relative position of a vehicle in front of its own vehicle, obtained from the radar unit 2, and a future path for its own vehicle estimated from the vehicle speed and steering angle (or yaw rate) of its own vehicle. The front vehicle information processing unit 61 also temporarily stores map information representing the plotted position and future path.

The front vehicle information processing unit 61 further plots in an absolute coordinate system the relative position of a vehicle in front of its own vehicle, obtained from the radar unit 2, and information of movement of its own vehicle, obtained from the vehicle speed and steering angle (or yaw rate) of its own vehicle. The front vehicle information processing unit 61 also temporarily stores map information representing a history of movement of its own vehicle and the front vehicle.

The processor 6 also has a preceding vehicle determining unit 62 which determines a front vehicle positioned on the estimated path and at a shortest distance from its own vehicle, as a preceding vehicle which its own vehicle is to follow, in the map information representing the estimated path for its own vehicle and the position of the front vehicle in the common coordinate system.

Operation of the processor 6 will be described below with reference to FIG. 4.

Figure 4:
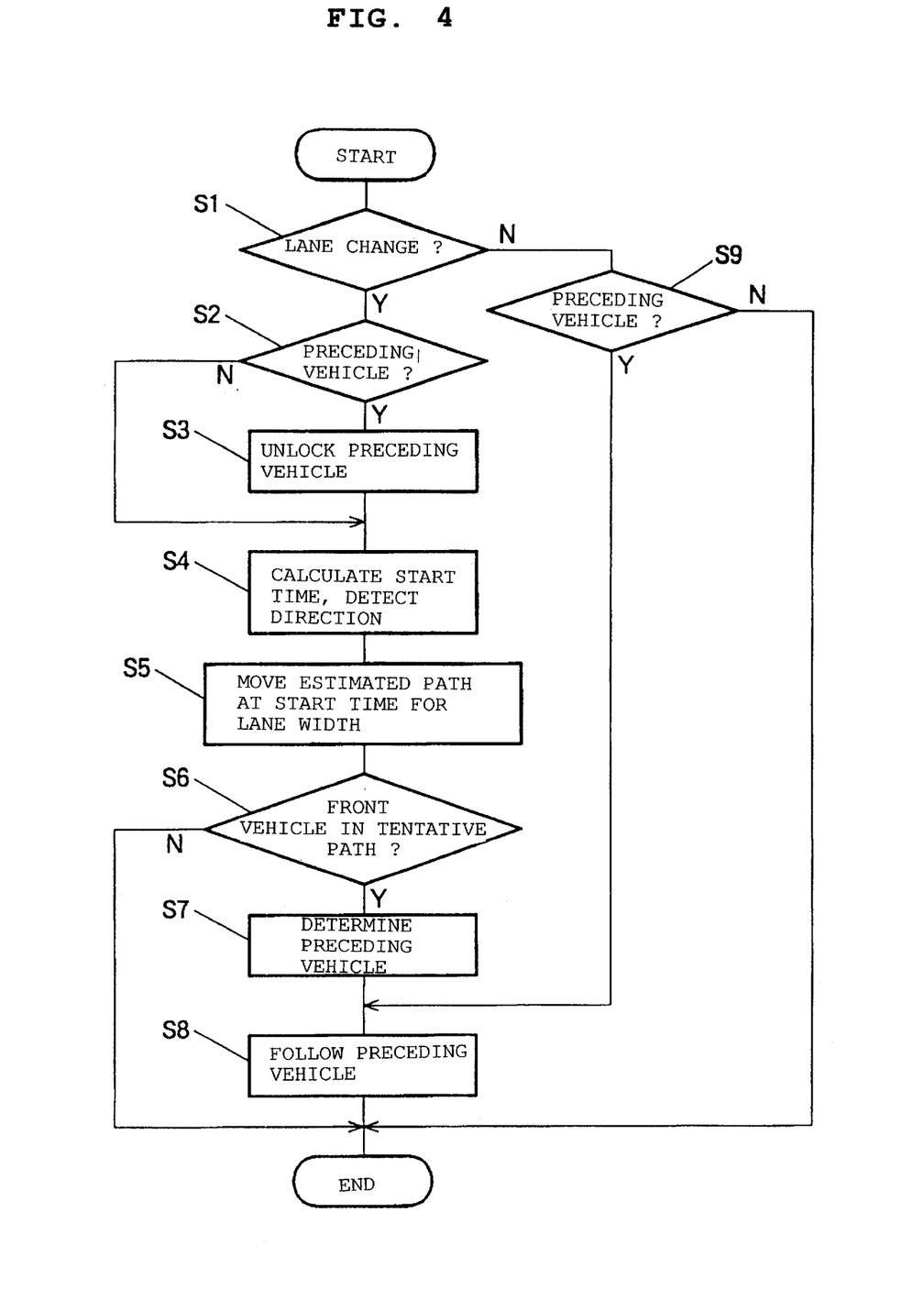
FIG. 4 is a flowchart of an operation sequence of a processor of the vehicle control system shown in FIG. 3.

The processor 6 repeatedly executes a succession of steps shown in FIG. 4.

In step S1 the processor 6 decides whether its own vehicle is making a lane change or not from the lane change signal. If its own vehicle is not making a lane change, then the processor 6 decides whether there is a preceding vehicle which its own vehicle is locking on in step S9. If there is a preceding vehicle which its own vehicle is locking on, then the processor 6 continuously controls its own vehicle to follow the preceding vehicle in step S8. A mode in which its own vehicle runs while following the preceding vehicle is referred to as a pursuit vehicle control mode. If there is not a preceding vehicle which its own vehicle is locking on, then the operation sequence shown in FIG. 4 is finished, and the processor 6 controls its own vehicle to run in a manual control mode or an automatic cruise control mode.

The pursuit vehicle control mode, the manual control mode, and the automatic cruise control mode, and switching between these modes may be warned to the driver of its own vehicle with a human voice, a buzzer, or a lamp.

If its own vehicle is making a lane change, then the processor 6 decides whether there is a preceding vehicle which its own vehicle is locking on presently or immediately prior to the lane change (or there is a vehicle presently determined as a preceding vehicle) or not in step S2. If there is a preceding vehicle which is being locked on (automatically tracked), then the processor 6 immediately unlocks the preceding vehicle or cancels the decision to determine the vehicle as the preceding vehicle in step S3.

In step S4, the processor 6 calculates a start time Ts (also see FIG. 5) when the lane change has started from a detection time Tt when the lane change has been detected, and also detects a direction (left or right) of the lane change.

In step S5, the processor 6 extracts map information of the estimated path for its own vehicle at the start time Ts from the map information representing the position of the front vehicle and the estimated path for its own vehicle. The processor 6 then moves the estimated path for its own vehicle in the detected direction (left or right) of the lane change for the calculated width W in the extracted map information, and uses the moved path as a expected path.

In step S6, the processor 6 decides whether there is a vehicle in front of its own vehicle in the expected path on the map information in which the expected path is plotted.

If there is a vehicle in front of its own vehicle in the expected path, then the processor 6 determines a front vehicle positioned at a shortest distance from its own vehicle as a preceding vehicle in step S7.

The processor 6 then controls its own vehicle to follow the preceding vehicle in step S8.

If there is not a vehicle in front of its own vehicle in the expected path, then the processor 6 determines there is no preceding vehicle after the lane change, and controls its own vehicle to run in the automatic cruise control mode.

Figure 5:
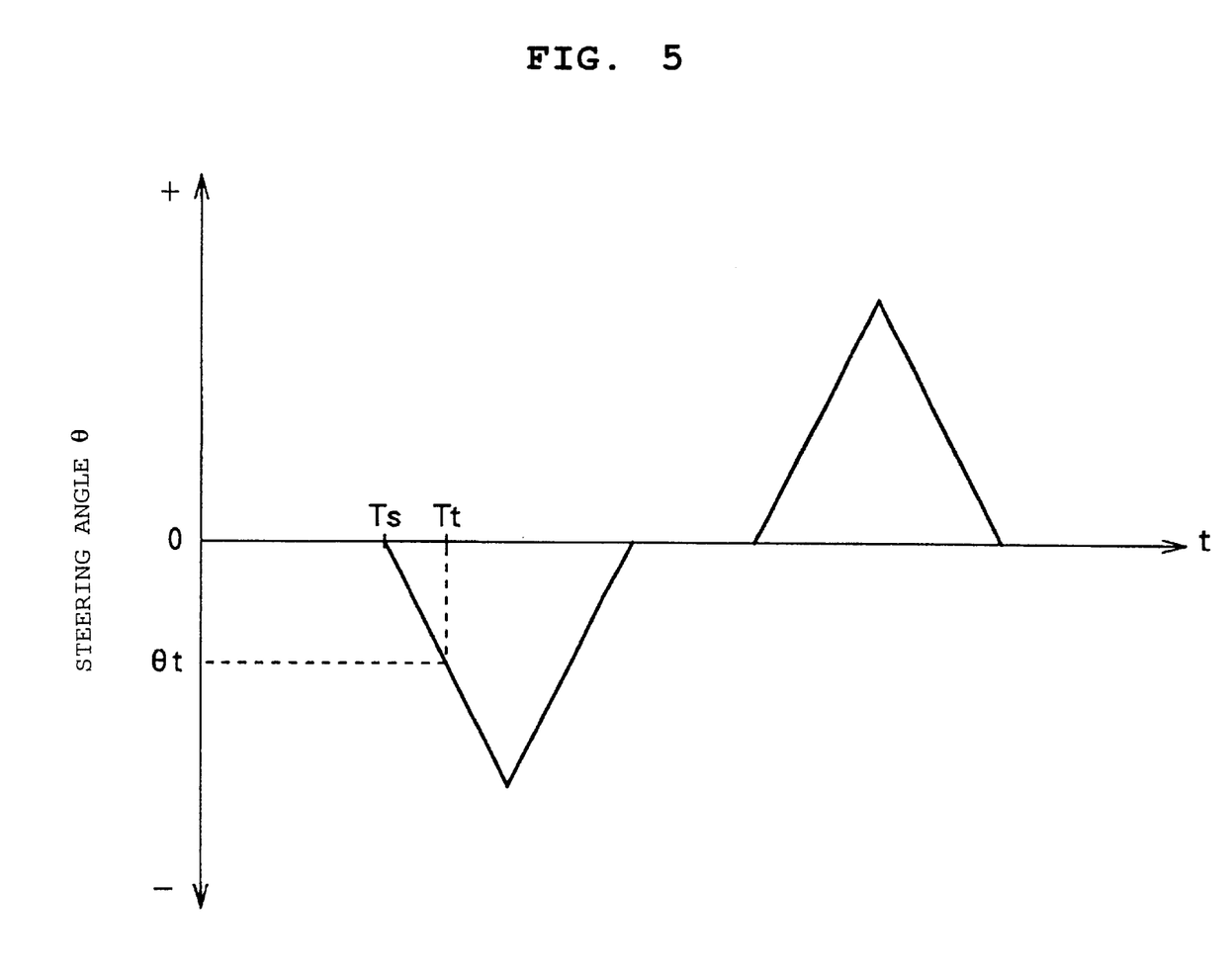
FIG. 5 is a diagram showing the manner in which the steering angle of a vehicle which makes a lane change varies with time, and a threshold value.

FIG. 5 shows the manner in which the steering angle θ of the vehicle varies when the vehicle makes the lane change. The yaw rate of the vehicle varies in the same pattern as the steering angle θ.

The processor 6 uses the time when the steering angle θ exceeds a threshold level θt as the detection time Tt. The processor 6 calculates the start time Ts from the detection time Tt as described above.

The processor 6 is capable of temporarily storing the yaw rate detected from the yaw rate sensor 51 and the steering angle detected from the steering angle sensor 52.

The processor 6 and the CPU 55 may be combined as a single processing and controlling system.

Figure 6A:
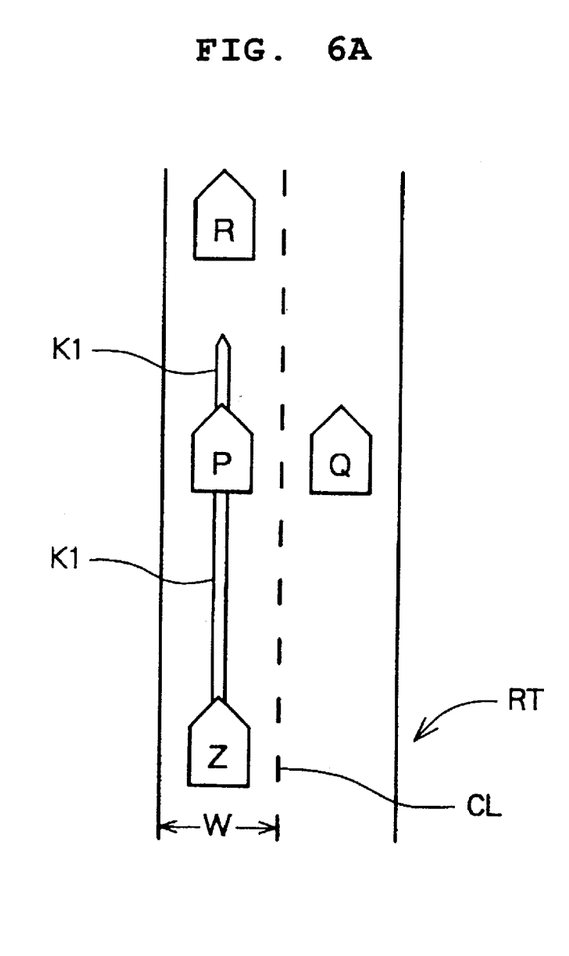
FIG. 6A is a schematic plan view illustrative of map information representing an estimated path for a vehicle before making a lane change and the position of a preceding vehicle.
Figure 6B:
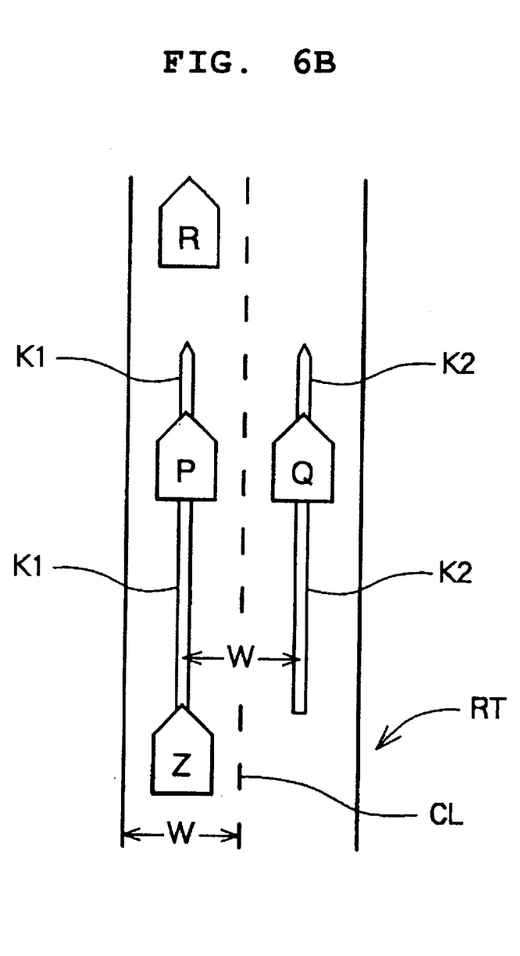
FIG. 6B is a schematic plan view illustrative of map information representing a expected path for a vehicle after making a lane change and the position of a preceding vehicle.

FIG. 6A illustrates map information representing an estimated path K1 for a vehicle before making a lane change and the position of a preceding vehicle, and FIG. 6B illustrates map information representing a expected path K2 for a vehicle after making a lane change and the position of a preceding vehicle.

In FIGS. 6A and 6B, its own vehicle z which incorporates the vehicle control system runs in one of lanes of a road RT which are divided by a lane line CL, each of the lanes having a width W. FIG. 6A shows an estimated path K1 for the vehicle Z in the present lane, and FIG. 6B shows an expected path K2 for the vehicle Z in the adjacent lane.

Before making a lane change, the vehicle Z runs in the present lane while following a preceding vehicle P. The processor 6 estimates the path K1 for the vehicle Z in the direction of the preceding vehicle P.

If the processor 6 recognizes a lane change based on a lane change signal, then the processor 6 moves the estimated path K1 for its own vehicle to the direction of the lane change for the width W, thus obtaining the expected path K2 in the adjacent lane to which the lane change is made. Therefore, a front vehicle Q running on the expected path K2 in the adjacent lane can quickly be determined as a new preceding vehicle.

Figure 7:
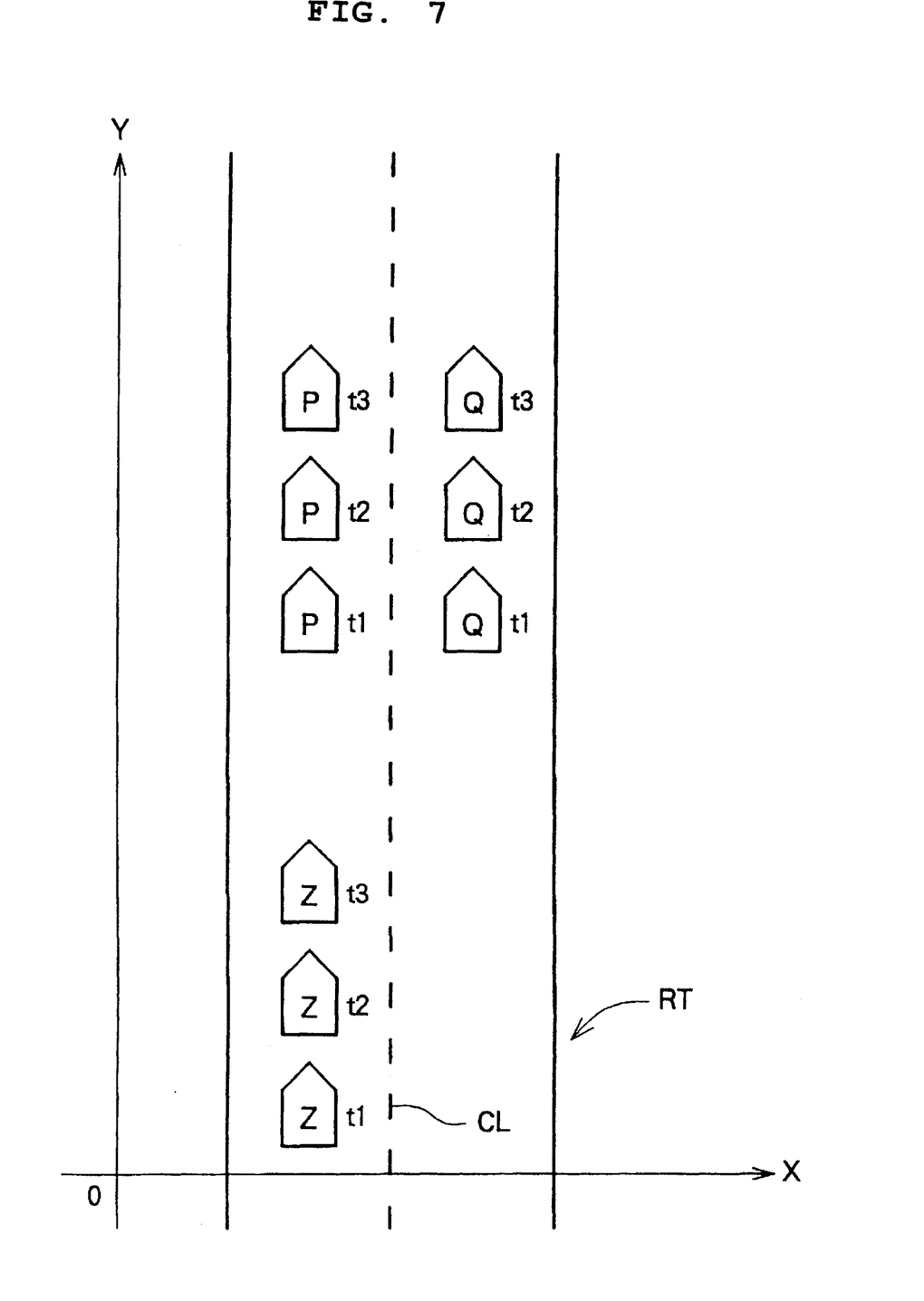
FIG. 7 is a schematic plan view illustrative of map information representing a history of movement of a vehicle and other vehicles running in front of the vehicle.

FIG. 7 illustrates map information representing a history of movement of a vehicle Z and front vehicles P, Q running in front of the vehicle Z.

In FIG. 7, positions of the vehicles Z, P, Q are plotted in an absolute coordinate system, e.g., an X-Y coordinate system, at successive times t1, t2, t3. When the vehicle Z makes a lane change, the processor 6 may determine a preceding vehicle on a historical map representing such plotted positions of the vehicles Z, P, Q. The processor 6 may estimate a future path for the vehicle Z based on the history of movement of the front vehicles P, Q.

When making a lane change, the driver may temporarily interrupt the pursuit vehicle control mode, and may subsequently resume the pursuit vehicle control mode by operating a resume switch.

Alternatively, when a lane change is made, the processor 6 may automatically interrupt the pursuit vehicle control mode, and subsequently resume the pursuit vehicle control mode when the driver operates the resume switch.

The vehicle control system according to the illustrated embodiment estimates a future path for its own vehicle and uses the estimated future path to determine a preceding vehicle. However, the vehicle control system may be arranged to estimate a future lane for its own vehicle and use the estimated lane to determine a preceding vehicle.

The vehicle control system according to the present invention offers various advantages as described below.

When its own vehicle makes a lane change while in the pursuit vehicle control mode, it can quickly unlock the preceding vehicle which it has locked on thus far, and quickly calculate information of a front vehicle which its own vehicle has to lock on next.

Therefore, the driver of its own vehicle can quickly accelerate or decelerate the vehicle in the lane change just like the driver does in the manual control mode. The vehicle can thus be controlled smoothly to follow the preceding vehicle without the driver's feeling embarrassed or uncomfortable upon the lane change.

Furthermore, since a lane change from one lane to an adjacent lane is first detected by the lane change detector and a preceding vehicle is then determined in the adjacent lane, any front vehicle running in another lane is prevented from being determined as a preceding lane.

Although a certain preferred embodiment of the present invention have been shown and described in detail, it should be understood that various changes and modifications may be made therein without departing from the scope of the appended claims.

What is claimed is:

1. A vehicle control system for controlling a motor vehicle, the vehicle control system comprising:
   a radar unit for detecting a relative distance from the motor vehicle to a vehicle in front of the motor vehicle and a relative speed of the vehicle in front of the motor vehicle with respect to the motor vehicle, and outputting information representing the relative distance and the relative speed;
   a lane change detector for detecting a lane change which is being made by the motor vehicle, and outputting a lane change signal indicative of the lane change being made; and
   a processor for estimating a future lane or path for the motor vehicle from the lane change signal from the lane change detector, unlocking a preceding vehicle which the motor vehicle has followed, and determining a new preceding vehicle which the motor vehicle is to lock on based on the estimated future lane or path and the information outputted by the radar unit.

2. The vehicle control system of claim 1, wherein the processor further comprises means for determining a vehicle closest to
   the motor vehicle in the estimated future lane or preceding vehicle which the motor vehicle is to follow based on the estimated future lane or path and the information outputted by the radar unit.

3. The vehicle control system of claim 1, wherein the lane change detector comprises a steering angle sensor for detecting a steering angle of the motor vehicle and means for outputting the lane change signal when the detected steering angle is greater than a predetermined threshold.

4. The vehicle control system of claim 1, wherein
   the lane change detector comprises a yaw rate sensor for detecting a yaw rate of the motor vehicle and means for outputting the lane change signal when the detected yaw rate is greater than a predetermined threshold.

5. A method for controlling a motor vehicle, the method comprising the steps of
   a. detecting a relative distance from the motor vehicle to a vehicle in front of the motor vehicle and a relative speed of the vehicle in front of the motor vehicle with respect to the motor vechicle, and outputting information representing the relative distance and the relative speed,
   b. detecting a lane change which is being made by the motor vehicle, and outputting a lane change signal indicative of the lane change being made, and
   c. estimating a future lane or path for the motor vehicle from the lane change signal from detecting the lane change, unlocking a preceding vehicle which the motor vehicle has followed, and determining a new preceding vehicle which the motor vehicle is to lock on based on the estimated future lane or path and the information obtained in Step a.

6. A method as in claim 5 further comprising determining a vehicle closest to the motor vehicle in Step c which the motor vehicle is to follow based on the estimated future lane or path and the information outputted in Step a.

7. A method as in claim 5 comprising detecting a steering angle of the motor vehicle and outputting the lane change signal when the detected steering angle is greater than a predetermined threshold.

8. A method as in claim 5 comprising detecting a yaw rate of the motor vehicle and outputting the lane change signal when the detected yaw rate is greater than a predetermined threshold.

* * * * *